April 25, 1933.  M. BERKOWITZ  1,905,886

MOTION PICTURE PROJECTING MACHINE

Filed Aug. 5, 1930   2 Sheets-Sheet 1

INVENTOR
MICHAEL BERKOWITZ
BY
ATTORNEYS

April 25, 1933.  M. BERKOWITZ  1,905,886
MOTION PICTURE PROJECTING MACHINE
Filed Aug. 5, 1930  2 Sheets-Sheet 2
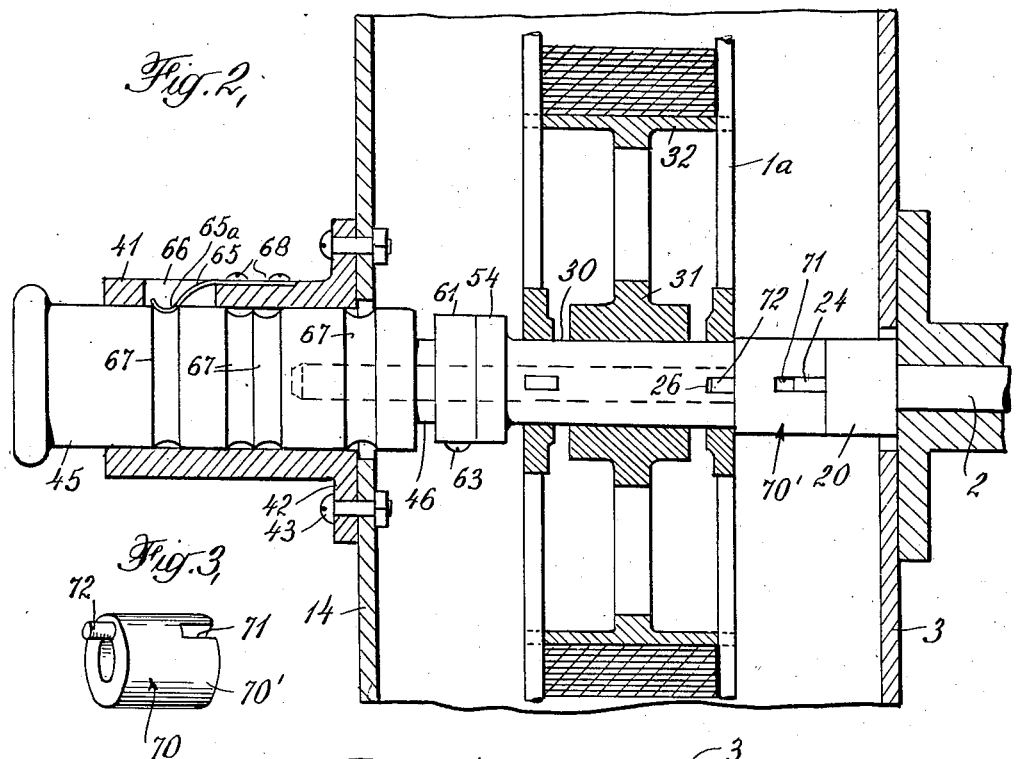
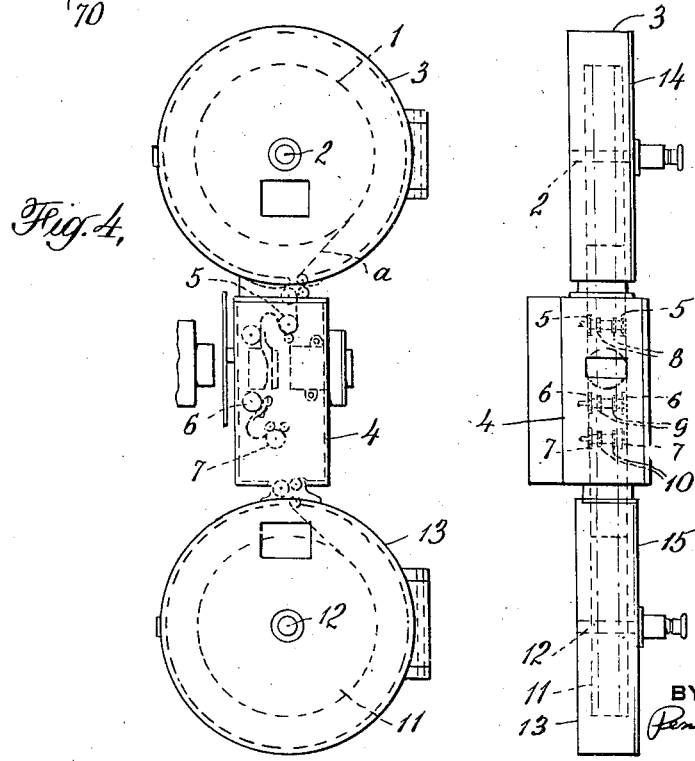
INVENTOR
MICHAEL BERKOWITZ
BY
ATTORNEYS Patented Apr. 25, 1933

1,905,886

UNITED STATES PATENT OFFICE

MICHAEL BERKOWITZ, OF NEW YORK, N. Y., ASSIGNOR TO UNITED RESEARCH CORPORATION, OF LONG ISLAND CITY, NEW YORK, A CORPORATION OF DELAWARE

MOTION PICTURE PROJECTING MACHINE

Application filed August 5, 1930. Serial No. 473,176.

This invention relates to improvements in motion picture projecting machines and is more particularly directed to the provision of means for supporting the reels contained in the upper and lower magazines in alignment with the film feeding mechanism located within the projector housing. While the invention finds particular utility in conjunction with the projecting machine capable of interchangeable use with films of a plurality of different widths, as described and claimed in a copending application filed August 5, 1930, Serial No. 473,173 by Michael Berkowitz, it is not limited in its application to any specific type of projector.

In practically all the forms of commercial projectors now in general use the reel carrying the film is supported upon a freely rotatable stud shaft contained within a magazine immediately above the projector housing, the film being led down thru an opening in the top of the housing into engagement with a series of feeding sprockets from whence it passes to a take-up reel supported upon a continuously driven shaft contained in a magazine situated below the housing. These projectors heretofore have been designed to accommodate a film of a definite width, usually 35 mm. but in some cases 65 and 70 mm. Consequently by providing a fixed abutment upon the shafts appropriately located with respect to the size of film capable of being utilized by the machine the reels when inserted over the studs and moved axially therealong into engagement with the abutments are positioned in alignment with the series of film feeding sprockets, and every point upon the film as it is drawn thru the machine from the upper to the lower magazines described a path lying in a vertical plane. By such an arrangement the tension upon the film imposed by the feeding mechanism is uniformly distributed across its width avoiding any lateral pull thereon. In the case, however, of the form of projecting machine adapted to accommodate films of different widths, such as the projecting machine disclosed in the above-mentioned copending application in which the feeding mechanism comprises a series of pairs of sprocket wheels of different gages centrally arranged with respect to each other upon a common shaft, provision must be made for differentially locating the reels carrying films of various widths in vertical registry with their appropriate pairs of sprocket wheels.

It is one of the purposes of the present invention to provide means adapted to be selectively assembled with the reel-supporting shafts contained in the upper and lower magazines for aligning reels of different breadths with the feeding mechanism contained within the projector housing. These means more specifically comprise interchangeable spacers, or "adapters," capable of being slipped over the shafts and functioning in conjunction with fixed abutments to provide stops by which reels may be differentially positioned along the shaft.

When films of such widths as 65 and 70 mm. are used, as distinguished from the heretofore standard 35 mm. film, the reel-supporting shafts must be made longer to accommodate the reels of increased width. Since the latter widths of film are either substantially or exactly double the small size 35 mm. standard film the weight imposed upon the shaft for films of equal length is correspondingly increased. Under the conditions of a longer shaft and an increase in the load supported thereby there is a tendency for the shaft to flex throwing the reel out of alignment with a vertical plane coincident with the radii of the series of film feeding sprocket wheels. This not only concentrates the entire feeding tension in one margin of the film tending to rupture it transversely but also causes an edge of the film to be brought into contact with a flange of the rotating reel resulting in mutilation of the relatively fragile film strip. In order to insure against the above possibilities means are provided by the present invention for supporting the free end of the stud shaft during the operation of the machine, such means consisting of an anti-friction bearing held within a socket carried by the door of the film magazine and in encircling engagement with the free end of the stud shaft. This prevents springing of the shaft and maintains the reel against outward displacement therealong. A spring latching means is provided to retain the bearing in place.

The invention will be better understood from the following detail description of one exemplification, reference being had to the accompanying drawings in which:

Figure 2 is a cross-section similar to Fig. 1 but showing the manner of supporting a reel carrying a 35 mm. film in correct position within the magazine by the use of an adapter;

Figure 3 is a perspective of an adapter.

Figure 4 is a diagrammatic view of a projector in side elevation equipped with the shaft-supporting bearing of this invention; and Figure 5 is a diagrammatic view in end elevation of the projector shown in Figure 4.

Figure 1:
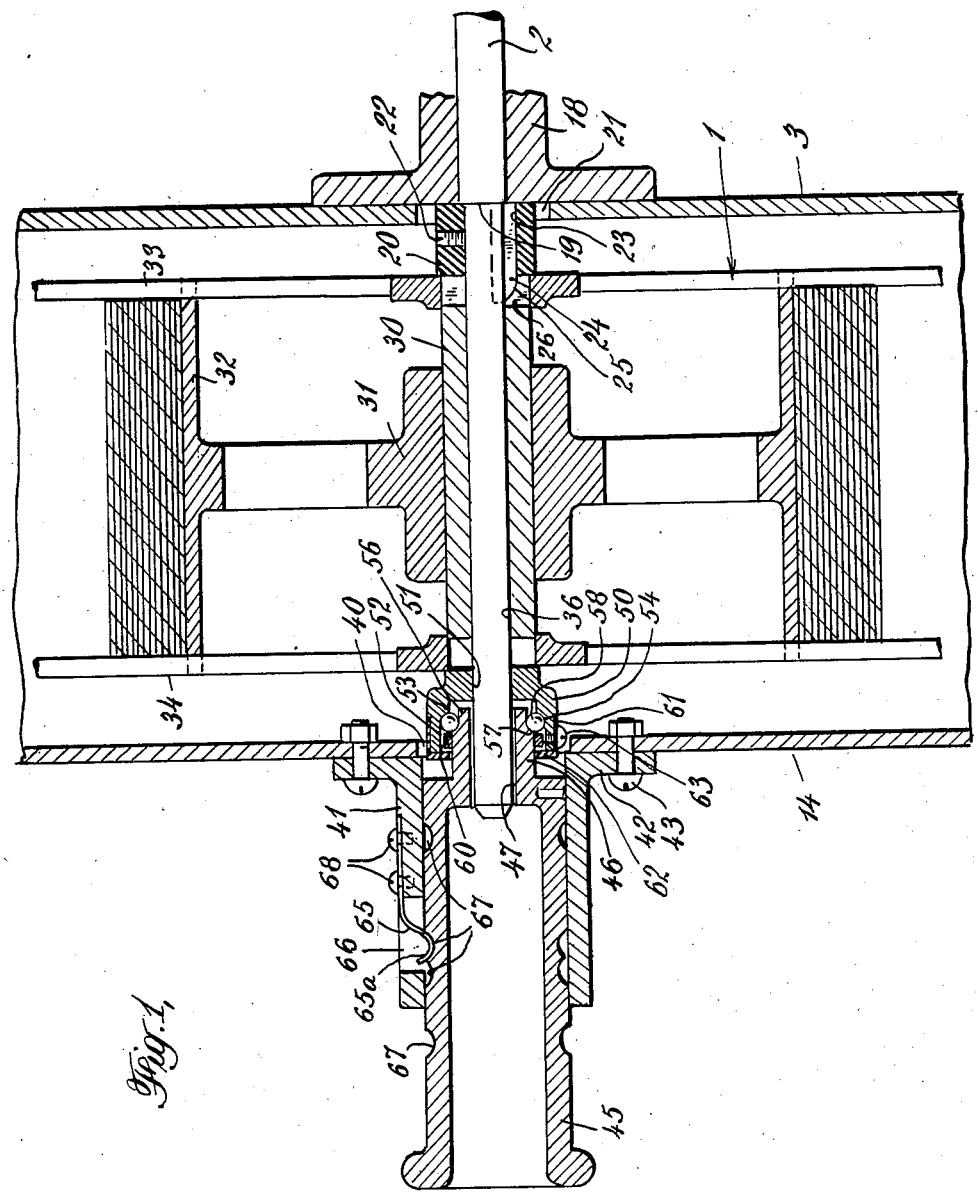
Figure 1 is a cross-section on a transverse plane thru the central portion of the upper film magazine and showing a reel carrying a 70 mm. film supported in place upon a stud shaft therein in accordance with the present invention.

In the projector shown in Figs. 4 and 5, which is of the form more particularly described and claimed in the above-mentioned copending application, a film $a$ provided with the usual rows of perforations along its opposite margins, is unwound from a reel 1 supported upon a freely rotatable stud shaft 2 contained in an upper magazine 3. The film passes down thru an opening in the top of a projector housing 4 where its perforations are brought into mesh with the appropriate pairs of feed sprocket wheels 5, 6, 7 or 8, 9, 10 depending upon the width of film being employed. The pairs of sprocket wheels 5, 6 and 7 are spaced apart upon shafts provided therefor a distance to engage, for the purpose of illustration, a 70 mm. film; while the pairs of sprocket wheels 8, 9 and 10, mounted upon the same shafts with and centrally located between the pairs of sprocket wheels 5, 6 and 7, are of such gage as to receive, for example, a 35 mm. film. From the bottom of projector housing 4 the film passes to the take-up reel 11 supported upon a driven stud shaft 12 contained in lower film magazine 13. The upper and lower magazines 3 and 13 are each provided with hinged doors 14 and 15 respectively to provide access to the interior of the magazines for the introduction and removal of reels. The shaft 2 is journaled within a fixed portion of the machine frame 18 and projects horizontally therefrom such a distance as to pass axially thru the cylindrical film magazine 3 which is supported at one side in a vertical position upon frame 18 of the machine.

As indicated in Fig. 1, which shows a partial section thru the upper film magazine 3 and which corresponds in all substantial respects to the lower magazine 13, the cylindrical shaft 2 is of reduced diameter for the portion of its length which protrudes beyond the frame 18 so as to define a shoulder 19 coplanar with the adjacent flat surface of frame 18. Upon the reduced end of this shaft is a stop collar 20 extending thru a clearance opening 21 in the side of the film magazine which is attached to the support 18. The collar 20 rests in engagement with the shoulder 19 where it is fastened by a set screw 22, and is provided with a slot 23 formed along its bore in which is received a key 24 carried by the shaft 2. This key, in addition to preventing relative motion between the collar and the shaft is of such a length to project a short distance beyond the outer face of the collar to form a rounded finger portion 25 designed to fit within one of the usual recesses 26 in the hub 30 of a reel. The reel 1 is of the ordinary construction comprising an arbor 31 having attached to its periphery a drum 32 upon which the film is wound, and two spaced discs 33 and 34 united with but extending beyond the edges of the drum and snugly receiving the film therebetween. The arbor 31 and flanges 33 and 34 are all rigidly attached to the hub 30 and the hub 30 is provided with an axial bore 36 such as to slidingly fit around the reduced end of shaft 2 to permit the reel to be shoved bodily along the shaft into engagement with the collar 20.

The door 14 of the magazine 3 is arranged to swing open and shut and is provided with a circular aperture 40 thru which the stud shaft 2 centrally projects. In order to afford a support for the free end of the stud shaft 2 the following structure is provided: The opening 40 is surrounded in concentric relation thereto upon the exterior of the door with a socket 41. The socket is provided with a lateral flange 42 which is rigidly fastened to the door by means of small bolts 43. Within the interior of the socket 41 is slidingly received a hollow cylindrical sleeve 45 of a reduced external circumference upon one end defining a cylindrical boss 46. The boss 46 has an axial bore 47 communicating with the interior of sleeve 45.

Fitting over the end of the boss 46 and of slightly smaller external diameter than the sleeve 45 is a cap 50. This cap is provided with a central opening 51 somewhat smaller than but concentric with the bore 47 and is designed to encircle and provide a bearing for the outer end of the shaft 2. The internal circumference of the cap is defined by two axially displaced cylindrical walls 52 and 53 arranged in concentric relation, as shown in Fig. 1, and connected by and annular arcuate wall portion 54. The end of the boss 46 is provided with a reduced circumference 56 which merges with the larger circumference of the boss thru an arcuate wall portion 57 corresponding in curvature to the wall 54. The walls 54 and 56 are designed to provide seats for a series of balls 58 interposed therebetween so as to form an antifriction bearing for the cap 50. For retaining the cap 50 and socket 45 in assembly a ring 60 is secured by a drive fit upon the boss 46 and is designed to overlap an inwardly projecting flange 62 of a retaining member 61 encircling the end of the cap and held in place by a screw 63. The sleeve 45 is resiliently latched in position at selectively different positions within the socket 41 by means of a steel spring 65 fastened upon the socket by screws 68 and extending thru an opening 66 in the socket so as to engage its terminal lip 65a with any one of a series of notches 67 spaced longitudinally of the sleeve.

It will be apparent from the above description that a reel 1, containing a 70 mm. film is slid upon the stud shaft 2 into engagement with the collar 20 which locates it in correct alignment with respect to the pairs of wide-gage sprocket wheels 5, 6 and 7 of the projecting machine, after which the door 14 of the magazine is closed and the sleeve 45 telescoped within the socket 41 to bring the end of shaft 2 to bear within the opening 51 of cap 50. When the sleeve has been moved such distance within the socket 41 as to cause the cap 50 to contact with the flange 34 of the reel the spring 65 will snap into engagement with an appropriate notch 67 and hold the reel against outward movement along the shaft. By reason of the ball-bearing mounting of the cap 50 friction between the cap and shaft 2 is reduced to a minimum and consequently adds no appreciable amount of tension to the film which is being drawn down into the projector housing by the feed sprocket wheels. As a result of the above construction danger of injury to the film due to flexing of the shaft under the heavy load is prevented owing to the support afforded by the sleeve 45 for the outer end of the stud shaft.

When, however, it is desired to feed a film of 35 mm. means must be provided for locating a reel 1a of the corresponding narrower width in proper position upon the shaft. As will be apparent from a consideration of Fig. 2, if the latter width of reel was inserted upon the shaft 2 in contact with the collar 20, the film in passing from the upper to the lower magazines would be drawn laterally by the pairs of small-gage sprocket wheels 8, 9 and 10 out of a straight line connecting the two reels. To avoid any such misalignment an adapter 70 is interposed between the collar 20 and the reel 1a. This adapter is of the form shown in Fig. 3 and consists essentially of an annular ring 70', having a recess 71 intersecting one end and so shaped as to receive therein the key 24 extending from collar 20 when the adapter is slipped over the shaft 2 and shoved therealong into engagement with the collar. The opposite end of the ring 70 is provided with a longitudinally projecting pin 72 designed to be received within the slot 23 of the reel. The adapter thus serves, in conjunction with collar 20, to correctly position the reel 1a in the machine with respect to the feed mechanism and also to lock the reel to the stud shaft 2 thru the intermediary of collar 20.

It will be understood that when reels are being used of a smaller width than the maximum adapted to be employed in the machine the sleeve 45 functions in the same manner as with the largest width reels except that in the latter case it projects farther into the socket than in the former and the spring 65 engages in a suitable notch 67 nearer the outer end of the sleeve. In all other respects the arrangement is the same, the free end of the shaft 2 being journaled in the rotatable cap 50 which also acts as a thrust bearing to hold the reel against outward shifting movement.

Since the construction described for supporting the reel in the upper magazine is duplicated in the lower magazine in every substantial particular a description of this latter structure is unnecessary. It may however be noted that whereas the reel-supporting shaft in the upper magazine is freely rotatable, the shaft in the lower magazine is positively driven by mechanism well known in the art; but whether the reel-supporting shafts be driven or not is immaterial so far as this invention is concerned.

I claim:

1. In a projecting machine having an upper film magazine, a lower film magazine and a film feeding mechanism intermediate the upper and lower magazines, a stud shaft in one of the magazines, a fixed abutment thereon located at a substantial distance inwardly from the free end of the stud shaft, a reel supported by the stud shaft, and means for supporting the free end of the stud shaft comprising a socket carried by the magazine, a sleeve extending thru the socket and a freely rotatable member carried by the end of the sleeve for supporting the free end of the stud shaft.

2. In a projecting machine having an upper film magazine, a lower film magazine and a film feeding mechanism intermediate the upper and lower magazines, a stud shaft in one of the magazines, a fixed abutment thereon located at a substantial distance inwardly from the free end of the stud shaft, a reel supported by the stud shaft, and means for supporting the free end of the stud shaft comprising a socket carried by the magazine, a sleeve extending thru the socket, a freely rotatable cap carried at the end of the sleeve for supporting the free end of the stud shaft and adapted to maintain the reel against outward displacement along the shaft, and means for retaining the sleeve within the socket in various adjusted positions longitudinally of its length.

3. In a projecting machine a film magazine, a hinged door constituting one side of the magazine and providing access to the interior of the magazine, a stud shaft extending transversely of the magazine for supporting a reel therein, a socket carried by the door in axial alignment with the stud shaft and an insertible sleeve receivable in the socket and adapted to extend thru the door of the housing into supporting engagement with the free end of the stud shaft.

4. In a projecting machine a film magazine, a hinged door constituting one side of the magazine and providing access to the interior of the magazine, a stud shaft extending transversely of the magazine for supporting a reel therein, a socket carried by the door in axial alignment with the stud shaft, an insertible sleeve receivable in the socket and adapted to extend thru the door of the housing into supporting engagement with the free end of the stud shaft, and means for impositively retaining the sleeve within the socket in adjusted positions longitudinally of its length.

In testimony whereof I affix my signature.

MICHAEL BERKOWITZ.